COMPUTING DEVICE INCLUDING AN ELECTRICAL DELAY LINE WITH A PLURALITY OF TAPS EACH CONNECTED TO A POTENTIOMETRIC NETWORK WHICH IS CONTROLLED BY A STRIP ELEMENT

Filed April 10, 1964 3 Sheets-Sheet 1

INVENTOR.
DANIEL SILVERMAN
BY William T. McClain
ATTORNEY

COMPUTING DEVICE INCLUDING AN ELECTRICAL DELAY LINE WITH A PLURALITY OF TAPS EACH CONNECTED TO A POTENTIOMETRIC NETWORK WHICH IS CONTROLLED BY A STRIP ELEMENT

Filed April 10, 1964 3 Sheets-Sheet 2

INVENTOR.
DANIEL SILVERMAN
BY William F. McClain
ATTORNEY

COMPUTING DEVICE INCLUDING AN ELECTRICAL DELAY LINE WITH A PLURALITY OF TAPS EACH CONNECTED TO A POTENTIOMETRIC NETWORK WHICH IS CONTROLLED BY A STRIP ELEMENT

Filed April 10, 1964 3 Sheets-Sheet 3

INVENTOR.
DANIEL SILVERMAN
BY William T. McClain
ATTORNEY

United States Patent Office 3,399,300

Patented Aug. 27, 1968

3,399,300

COMPUTING DEVICE INCLUDING AN ELECTRICAL DELAY LINE WITH A PLURALITY OF TAPS EACH CONNECTED TO A POTENTIOMETRIC NETWORK WHICH IS CONTROLLED BY A STRIP ELEMENT

Daniel Silverman, Tulsa, Okla., assignor to Pan American Petroleum Corporation, Tulsa, Okla., a corporation of Delaware Filed Apr. 10, 1964, Ser. No. 358,870
12 Claims. (Cl. 235—193)

ABSTRACT OF THE DISCLOSURE

This invention concerns an improved computer apparatus which can be rapidly and economically adjusted to reflect changes in a function to be put to the computer. It includes an electrical delay line provided with a plurality of take-out taps spaced along its length. A multiplicity of potentiometric networks are connected to each of the taps. By adjusting these potentiometric networks, the computing function can be modified. An electrical summing network is connected to the potentiometric networks. A strip element having a characteristic representative of one of the functions of the computer is provided in which it varies along its length. The strip element cooperates with the potentiometric networks to set the desired ratio values to the potentiometric networks.

Figure 1:
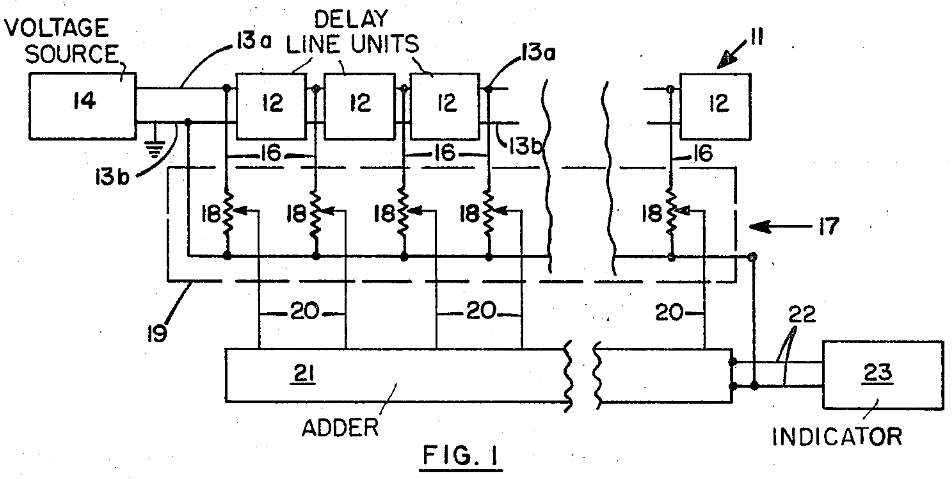

This invention relates to computing devices, and more particularly, it relates to an analog computer employing an electrical delay line. More specifically, the present invention is concerned with such a delay line device wherein there is provided improved apparatus permitting the computer to be set up for use more rapidly and economically.

In solving physical problems, one is often interested in determining the degree of correlation which exists between two sets of measurements. For example, in the interpretation of seismic traces it is often desirable to determine the degree of correlation between a seismographic trace and a known seismic signal. The computations required to determine the degree of correlation between such measurements involve the multiplication of paired values of two inputs and the summation of the resulting products over a time period, while shifting the time-phase relationship between the two inputs during the summation step. For example, U.S. Patents 2,779,428 and 2,989,726 disclose the use of such correlation techniques in seismographic operations.

Because of the very large number of computations required in the correlation procedure, various automatic computing apparatus is desirable for this purpose. For example, both digital and analog computers have been used to determine the degree of correlation between seismic traces. However, analog equipment is generally preferable where the computations are to be made in the field. For example, U.S. Patent 2,712,415 discloses an optical computer for multiplying and integrating two functions, each of which is established on a variable area light transmission plate. Also, apparatus utilizing a time delay system has been proposed for separating desired signals from noise. (See the articles, "Magnetic Delay Line Filtering Techniques," by Jones et al., Geophysics, vol XX, pp. 745–765, October 1955, and "Cross-Correlation Filtering," by Jones et al., Geophysics, vol. XIX, pp 660–685, October 1954.) However, even with such automatic equipment the time and expense required to prepare the equipment for use may be prohibitive, especially in instances where one or more of the functions to be correlated is a long time function. Even small changes in one of the functions to be correlated require considerable time and expense in making adjustments to reflect these changes. Further, such equipment is generally not well suited for field use, both from the standpoint of the time and care required in setting up the equipment for use.

Accordingly, a general object of the present invention is improved computer apparatus which may be rapidly and economically adjusted to reflect desired changes in a function to be put into the computer. Another object is an improved correlator for electrical signals, especially well adapted for determining the degree of correlation between seismographic traces, which apparatus is rapid and accurate in operation, while being economical, portable and well adapted for field use.

Briefly, the present invention comprises an electrical delay line provided with a plurality of take-out taps spaced along its length to present, at predetermined time delays, a first function applied to the delay line, a multiplicity of potentiometric networks each connected to one of the taps for applying a second function to the apparatus, an electrical summing network connected to the potentiometric networks for summing the outputs therefrom and a removable sheet element cooperating with the potentiometric networks for setting the ration values of the potentiometric networks in accordance with variations in the second function.

The invention will be better understood by reference to the following description of the invention and to the accompanying drawings of preferred embodiments of the invention.

Figure 2:
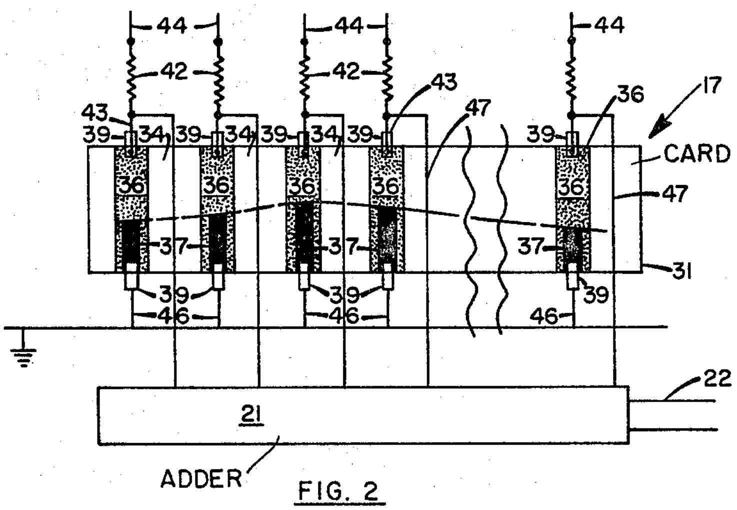
Figure 3:
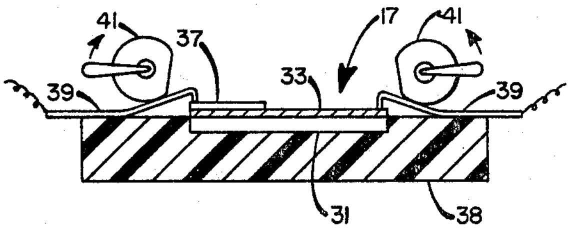
Figure 4:
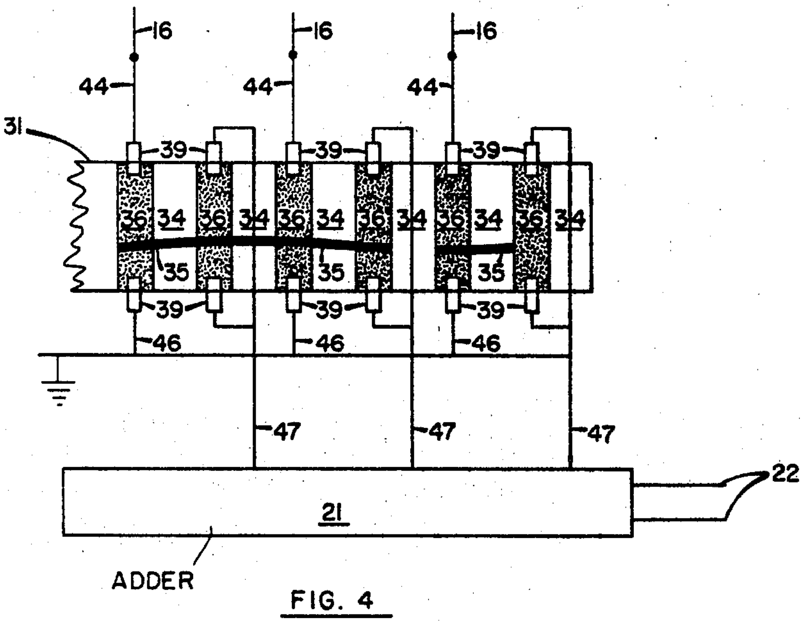
Figure 5:
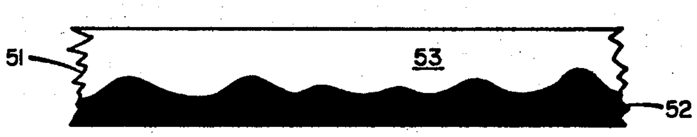
Figure 7:
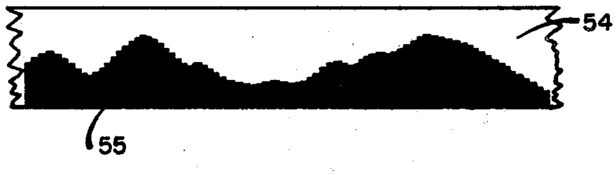
Figure 6:
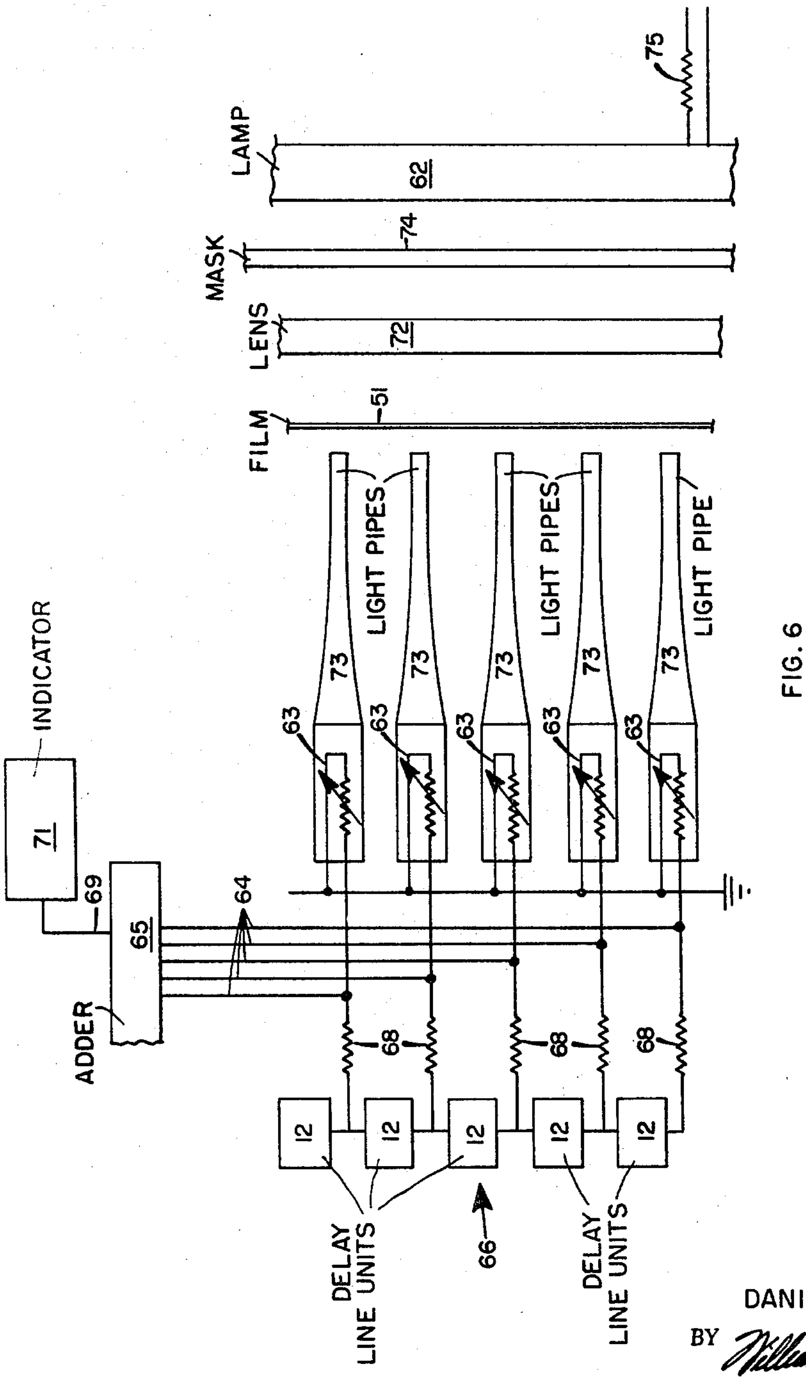

In the drawings:

FIGURE 1 is a block diagram illustrating components of a delay line computing apparatus; and FIGURE 2 schematically illustrates one embodiment of a resistor-bearing strip element employed in setting the ratio values of the potentiometers of FIGURE 1; and FIGURE 3 is illustrative of a means for connecting the strip element of FIGURE 2 into the apparatus of the invention; and FIGURE 4 schematically illustrates a second embodiment of resistor-bearing strip element employed in the invention; and FIGURE 5 is illustrative of a typical photographic record of a seismic trace; and FIGURE 6 schematically illustrates an embodiment of the invention utilizing a radiation-controlling strip element to set the ratio values of the potentiometers of a delay line computing apparatus; and FIGURE 7 is illustrative of another embodiment of a radiation-controlling strip element wherein the varying characteristics of the strip element are produced by a pen recorder.

Referring to FIGURE 1, there is shown a block diagram representative of component parts of a computing apparatus according to the invention. The computer includes an electrical delay line 11 which is comprised of a series of lumped inductance-capacitance delay line units 12 for time delay of an alternating current signal representative of a first function, such as a seismic signal, fed into the apparatus. Each delay line unit provides a specific known time delay, and multiple delay line units may be connected in series to provide the total time delay desired, which typically is at least equal to the duration of the shortest signal to be correlated. Of course, the total time delay provided by the delay line will be determined by the total number of delay line units in the length of delay line employed and by the characteristics of these units. For the sake of brevity and clarity only a small number of delay line units are shown in FIGURE 1, although in practice several hundred or several thousand such units may be employed, depending upon the length of the signal to be applied to the apparatus. The delay line units are connected by electrical conductors 13*a* and 13*b* to form a continuous circuit, and at the input end, conductors 13*a* and 13*b* are connected to a voltage source 14, such as a signal generator, magnetic recorder or the equivalent for continuously applying a first function, represented by variations in the applied voltage over a period of time, to the apparatus. Multiple take-out taps 16 are spaced along delay line 11 to present, at specific time delays, the voltage of the signal applied to the delay line after transmission over a preceding portion of the line. Of course, the position of each tap will determine the time delay at the tap location.

A potentiometric means 17 comprised of a multiplicity of potentiometers 18, each connected to a corresponding tap 16, is provided for multiplying the voltage at each tap location by a factor, not greater than unity, which is representative of a second function applied to the apparatus. This second function, which may be a second seismic signal, is set into the apparatus by varying the ratio values of the potentiometers, so that electrical signals representative of the first function are multiplied at specific time delays over a selected total time by a factor derived from the second function. To reflect changes in the second function, it is necessary to reset the potentiometers in the potentiometric networks. A sheet element 19, preferably an elongate strip-like element (indicated by the dashed line), having a characteristic representative of the second function cooperates with the potentiometric networks to automatically vary the ratio values, or settings, of the potentiometers when it is inserted into the apparatus. The above-mentioned characteristic is variable along the length of the strip element and varies, in accordance with variations in the second function, to provide the desired potentiometer settings for each of the networks. In one preferred embodiment, hereinafter described, the strip element is provided with a plurality of resistors carried by a tape-like element, and these resistors are connected into and form a part of the potentiometric networks when the strip element is inserted into the apparatus. In another embodiment, also hereinafter described, the strip element is a radiation-controlling element, such as a variable area record of a seismic trace, which cooperates with a series of radiation-sensitive resistors, such as photoresistors, to vary the ratio values of the potentiometers in accordance with the amount of radiant energy received from a source, such as an incandescent filament.

Each potentiometric network is connected by electrical leads 20 to an electrical adder means 21, which may be one of several well-known circuits for adding electrical output signals from the potentiometers. Such an adding circuit typically comprises a group of high resistances, each connected to a corresponding potentiometer, and connected in parallel to a suitable amplifier. The potentiometer output voltages are thus changed to proportional currents, which are added together and amplified to provide a usable output from the apparatus. This output, typically, is fed by electrical conductors 22 to an indicator 23, such as a recorder, and serves to drive the indicator and provide a record of the degree of correlation existing between the first and second functions.

As mentioned above, sheet element 19 is employed to set the ratio values of the potentiometers 18 in accordance with variations in a second function to be correlated with the first function applied to delay line 11. In one preferred embodiment, plate element 19, as shown in FIGURES 2 and 3, is formed of an elongated section, such as a card or strip 31, formed of an electrically insulating substrate, or base member of ceramic, cardboard, paper or a suitable plastic. Such resistive films and techniques for producing them are well known. For example, pyrolitic carbon deposited on a substrate by the cracking of a hydrocarbon-inert gas mixture at elevated temperatures provides a resistor leaving a tolerance as low as about ±1 percent, and a wide range of resistances may be obtained by varying the dimensions and/or the composition and film characteristics. Carbon, carbon-boron or carbon alloy films may be utilized, or very thin metal films, such as those deposited from a vapor may be used. Similarly, carbonaceous films such as those deposited on a phenolic plastic for use in sliding contact potentiometers may be used. For example, strip 31 bears a uniform layer of an electrically resistive material 33, such as a thin carbonaceous or metallic film having a suitable resistivity. The resistive coating 33 is capable of being removed in narrow insulating strips 34 from the strip 31, as by scraping or the like, to provide a series of spaced, parallel resistors 36 transversely positioned on the tape. Alternatively, strip 31 may be fabricated with the series of spaced resistors on one surface, the resistors being separated from each other by uncoated sections of tape. The resistors 36 are each connected to one of the take-out taps 16, as hereinafter described, to form a part of the above potentiometric networks employed in the apparatus.

Due to the uniformity of the material and dimensions of the parallel resistors 36 the electrical resistance of each is equal, unless the resistances are varied purposely. The resistance of these are varied, in accordance with variations in the second function, by applying an electrically conducting coating 37, along various of the resistors. Typically, a conducting ink of the type commercially available is applied to an appropriate length of each resistor so that resistances of the resistors arranged along the length of the tape vary with the second function.

Preferably, a base block 38, having an elongated recess of an appropriate width and depth, is provided to receive the strip 31 for connection to the apparatus. Advantageously, base block 38 is provided with multiple pairs of electrical contact fingers 39 spaced along the elongated recess to electrically contact either end of each of the resistors 36. Contact fingers 39 are movably mounted on base block 38 so that they may be raised and lowered to insert a new tape into the apparatus when desired. Advantageously, these fingers are formed of resilient metallic strips cemented, riveted or otherwise secured at their outer ends to block 38 which is formed of an insulating material, such as a suitable plastic. Normally, fingers 39 spring upwards, free from contact with resistors 36. However, when it is desired to make contact with the resistors, cams 41, preferably formed from an insulating material such as a suitable plastic and rotatably mounted on block 38, are actuated to press down on the fingers and cause them to contact the appropriate resistors.

As shown in FIGURE 2, the potentiometric networks also include fixed resistors 42, individually connected by electrical leads 43 to contact fingers 39 to form the individual potentiometers. Electrical leads 44 connect the potentiometers to the appropriate take-out taps 16 along delay line 11, and electrical leads 46 are connected to ground. Electrical conductors 47 feed the potentiometer outputs to adder 21.

Thus, to change the potentiometer settings in accordance with the second function applied to the apparatus, an appropriate strip or card of the above type is inserted in the base block and the contact fingers closed on the resistors.

As described above in connection with FIGURE 2, the voltage (E) at one of the take-out taps 16 is multiplied by a factor determined by the ratio value of the potentiometer connected to the particular tap and the potentiometer output is fed to adder 21. Thus, the potentiometer output ($e$) is equal to $$E \times \frac{b}{a+b}$$

where $a$ represents the value of fixed resistance 42 and $b$ represents the resistance of resistor 36 as modified by the conductive ink 37.

As an alternative to the resistor arrangement shown in FIGURE 2, the series of parallel resistors 36 may be provided on strip 31, with conducting ink 35 bridging insulating space 34 between a pair of resistors 36, as shown in FIGURE 4, rather than by applying the conducting coating along an appropriate length of each of the resistors. Typically, a strip bearing the parallel resistors is run through a pen recorder which applies a continuous line of conducting ink along the length of the strip, the line drawn by the recorder being representative of the second function to be applied to the apparatus. Subsequently, the conducting ink is removed from every other of the insulating spaces 34, so that each pair of resistors 36 are connected by substantially a horizontal line 35 of conducting ink, with each of the resistor pairs being insulated from adjacent pairs. In this arrangement the separate fixed resistors 42 of FIGURE 2 are not required to complete the potentiometer network, since the two resistors of each potentiometer are provided by each pair of resistors connected through the line of conducting ink. Such an arrangement provides a broader range of ratio values which may be set into the potentiometers than is provided by the arrangement shown in FIGURE 2.

Advantageously, the strip element 19 may be prepared by passing the strip 31 through a pen recorder to which is applied a signal representative of the second function. If desired, the strip 31 may be perforated along one or both edges, the perforations working with a sprocket on the recorder to guide and move the strip through the recorder. The pen recorder employed may be a rectilinear servo-type recorder of the galvanometric type, or it preferably may be of the type employing a servo motor and drive cord to move the stylus or pen carriage over the strip. The strip coated with resistive film may be run through a recorder having a sharp stylus or knife to remove the resistive coating at intervals providing the series of parallel resistors, or a prefabricated resistor strip may be used as mentioned above. In such an operation where the strips of resistive material are removed at intervals, a suitable signal can be applied to the recorder to lower the knife and cause it to sweep completely across the strip to effect the removal of the resistive material, with the knife being picked up at the end of the sweep and returned to the zero position while the strip is incrementally advanced by the chart drive. At any rate, once the parallel resistors are provided, then an electrical signal, typically derived from a recording of a second function, is applied to the recorder and the recording pen applies the conducting ink to the strip. In the strip of FIGURE 2, the sweep of the pen along the length of each of the resistors 36 will be determined by the signal applied to the recorder at a given time so that the resistances of resistors 36 are varied in accordance with variations in the second function. In the strip shown in FIGURE 4, the pen recorder applies a continuous line of conducting ink to the strip, the amplitude of the line being varied according to variations in the signal applied to the recorder. In this latter case a suitable signal is then applied to the recorder to cause the stylus to move across alternate insulating spaces 34 to remove the conducting ink, while leaving, on alternate insulating spaces, the applied conducting ink connecting the pairs of resistors.

The strip element of FIGURE 4 may be inserted into the base block 38 of FIGURE 3 and connected to the delay line and adder circuits in a manner similar to that described above. To accomplish this it is only necessary to arrange electrical conductors 44, 46 and 47, as shown in FIGURE 4, so that alternate resistors are connected to taps 16 and adder 21.

Pen recorders of the type mentioned above are commercially available, and these recorders may be readily adjusted to provide the functions described. For example, such recorders are available from the Esterline-Angus Company, Beckman Instruments, Inc., Texas Instruments, Incorporated, Sanborn Company, and other such instrument manufacturers.

In another advantageous embodiment of the invention, sheet element 19 comprises a radiation-controlling strip, such as a strip of photographic film bearing a record of the second function, which film controls the radiant energy from a source, such as a light source, transmitted to a series of radiation-sensitive elements, such as photoresistors forming a part of the above-mentioned potentiometric networks. The photographic film may be either of the variable density or variable area type and is prepared by techniques well known in the art. For example, in preparing a variable area photographic record of the second function, a signal representative of the second function is fed to a galvanometer to which is connected a rotating mirror for directing a beam of light through a suitable aperture onto a photographic film. The width of the film exposed to the light is a function of the angle of the reflecting mirror the movement of which is controlled by the galvanometer. Since apparatus and techniques for producing such photographic records are well known in the art, it is not believed necessary to describe the same in detail herein.

FIGURE 5 illustrates a typical variable area photographic record of a seismic signal. The film strip 51, after exposure and development bears a record of the signal in the form of a relatively dark, opaque area 52, with the unexposed portion of the film being a relatively clear, transparent area 53. Alternatively, a similar strip may be prepared by passing a strip of radiation-transmitting material through a rectilinear pen recorder of the type described above, and applying an electrical signal, representative of one of the functions, to the recorder which then applies an opaque ink to the strip to produce variations in accordance with the variations in the signal applied to the recorder. Such a record may be of the type shown in FIGURE 7 where the clear strip 54 is coated with a series of inked lines applied to the strip by the recorder.

Referring now to FIGURE 6, a strip of photographic film 51 is prepared as mentioned above and placed in a suitable receiver between a light source 62 and photoresistors 63 of a type commercially available, the resistance of which varies with the amount of light striking the photoresistor. The photoresistors are connected by electrical leads 64 to an electrical adding circuit 65, of the type hereinbefore described, and to electrical delay line 66 comprising a number of delay line elements 12 and provided with multiple spaced taps 16, as mentioned above. Connected to each of the taps 16 are high resistances 68 and in series to ground with each of these high resistances photoresistors 63, as shown. The sum of the outputs from resistors 63 is passed by electrical conductor 69 to a suitable indicator 71, such as a recorder, for displaying the output from the adder 65.

Thus, the amount of light received by each of the photoresistors 63 varies according to the magnitude of the opaque area of the photographic film 51 opposite the photoresistor. Lens 72 may be employed to impress a uniform light on the strip of film 51, and, if desired, a series of plastic or glass light pipes 73 can be used to conduct light from the film to the appropriate photoresistors. By the use of such light pipes, the physical dimension of the length of film 51 cooperating with each of the photoresistors can be made any desired value irrespective of the physical dimensions of the light units. If desired, voltage or current control 75 may be applied to lamp 62, or a suitable mask 74 may be employed to control the intensity of light over all or a part of film 51 to provide a type of gain control on the potentiometers over and above that determined by film 51.

While, as shown in the drawings, the light pipes 73 are separated widely for purpose of clarity, in operation they will be placed in contiguous positions. Similarly, the resistors 36 will normally be placed close together, i.e., the insulating strip 34 is narrow.

From the foregoing description various modifications and alterations in the details of construction and operation of the apparatus of my invention will become apparent to the artisan, and it is to be understood that such modifications and alterations are within the spirit and scope of my invention.

I claim:

1. In computing apparatus for multiplying and integrating a plurality of functions wherein there is provided an electrical delay line having a multiplicity of take-out taps spaced along its length and adapted to present, at predetermined time delays, a first function applied to the delay line, a multiplicity of potentiometric networks connected to said taps, the ratio values of the potentiometers representing a second input function, and an electrical summing network connected to said potentiometric means for summing the outputs therefrom, the improvement comprising a sheet element bearing a variable characteristic representative of said second function and cooperating with said potentiometric means for setting the ratio values of said potentiometric networks in accordance with variations in said second function.

2. Computing apparatus for multiplying and integrating a plurality of functions comprising an electrical delay line; means for connecting the input end of said delay line to a voltage source providing a signal representative of a first function to be put into said apparatus; a plurality of take-out taps spaced along the length of said delay line to present said first function at specific time delays; a potentiometric network connected to each of said taps for multiplying the voltages at the tap locations by a factor representative of a second function to be put into said apparatus; electrical adder means connected to each of said potentiometric network for adding the resulting outputs from potentiometers in said potentiometric network; indicator means connected to said adder means for displaying the output from said adder means; a strip element having a characteristic representative of said second function and variable along the length of said element, said element cooperating with said potentiometric network to set the ratio values thereof in accordance with variations in said characteristic.

3. The apparatus of claim 2 wherein said strip element comprises a plurality of resistors having resistances representative of said second function, said resistors being positioned on said strip element to form a portion of said potentiometric network and adapted to be electrically connected to said potentiometric network.

4. The apparatus of claim 2 including a radiation source and wherein: said potentiometric network comprises radiation-sensitive resistor means connected to said taps and positioned to receive radiation from said source; said strip element comprises a radiation-controlling strip having a radiation-controlling characteristic varying along the length of said strip and representative of said second function, said strip element controlling the radiation received by resistor means to set the resistance thereof in accordance with variations in said second function.

5. The apparatus of claim 4 wherein said radiation source is a light source and said resistors are photoresistors.

6. Computing apparatus for multiplying and integrating a plurality of functions comprising:

a plurality of electrical delay line units serially connected to form an electrical delay line;

means for connecting the input end of said delay line to a voltage source providing a signal representative of a first function to be applied to said apparatus;

a plurality of take-out taps each connected to one of said delay line units to present said first function at specific time delays;

a plurality of potentiometric networks each connected to a corresponding take-out tap for multiplying the voltages at the tap locations by a factor representative of a second function to be applied to said apparatus;

a removable strip element bearing a plurality of resistors positioned along its length, said resistors being connectable to one of said potentiometric networks to form a portion thereof, the resistances of said resistors varying in accordance with said second function to vary the ratio values of said potentiometric networks;

electrical adder means connected to each of said potentiometric networks for adding the resulting outputs therefrom; and indicator means connected to said adder means for displaying the output therefrom.

7. The apparatus of claim 6 wherein said potentiometric networks each further comprise a fixed resistance connected to a corresponding tap and to one of said resistors, and wherein each of said potentiometric networks is connected to said adder means by an electrical conductor connected intermediate said fixed resistance and said resistor means.

8. The apparatus of claim 6 wherein each of said potentiometric networks comprises a pair of said resistors on said strip element, said pair of resistors being connected intermediate their ends by an electrical conductor, one end of one of the resistors in said pair being electrically connected to a corresponding tap and the other of said resistors being electrically connected to said adder means.

9. The apparatus of claim 6 wherein each of said resistors comprise a thin film of electrically resistive material and an electrically conducting coating in contact with a portion thereof to provide a predetermined electrical resistance therein.

10. Computing apparatus for computing and multiplying a plurality of functions comprising a plurality of electrical delay line units serially connected to form an electrical delay line;

means for connecting the input end of said delay line to a voltage source providing a signal representative of a first function to be applied to said apparatus;

a plurality of take-out taps each connected to one of said delay line units to present said first function at specific time delays;

a plurality of potentiometric means comprising radiation-sensitive resistors connected to said taps for multiplying the voltages at the tap locations by a factor representative of a second function to be applied to said apparatus;

electrical adder means connected to said radiation-sensitive resistors for adding the outputs therefrom;

a radiation source for irradiating said radiation-sensitive resistors;

a radiation-controlling strip having a radiation-controlling characteristic varying along its length for modulating the radiation received by said radiation-sensitive resistors, said characteristic being representative of said second function to vary the resistances of said radiation-sensitive resistors in accordance with variations in said second function.

11. The apparatus of claim 10 wherein said radiation source is a lamp and said resistors are photoresistors.

12. The apparatus of claim 10 further comprising a fixed resistance connected to said radiation-sensitive resistors and an electrical conductor intermediate said fixed resistance and said radiation-sensitive resistors connecting said potentiometric means to said adder means.

References Cited

UNITED STATES PATENTS

| | | | |
|---|---|---|---|
| 3,112,397 | 11/1963 | Crook. | |
| 3,136,974 | 6/1964 | Sirks. | |
| 2,453,313 | 11/1948 | Gordon | 29—620 |
| 1,859,112 | 5/1932 | Silberstein | 29—620 |

MALCOLM A. MORRISON, *Primary Examiner.*

J. F. RUGGIERO, *Assistant Examiner.*